Feb. 4, 1958 L. E. SEMLER 2,821,995
SAFETY VALVE

Filed Sept. 14, 1954 2 Sheets-Sheet 1

LLOYD E. SEMLER
INVENTOR

BY McMorrow, Berman & Davidson
ATTORNEYS

LLOYD E. SEMLER
INVENTOR

BY
McMorrow, Berman + Davidson
ATTORNEYS

United States Patent Office 2,821,995
Patented Feb. 4, 1958

2,821,995

SAFETY VALVE

Lloyd E. Semler, Bishop, Calif.

Application September 14, 1954, Serial No. 456,021

1 Claim. (Cl. 137—460)

This invention relates to a safety valve, adapted particularly to be connected in compressed air lines or other pressure fluid conduits, such as in a line extending to a jack hammer or other tool using compressed air.

In many instances, the compressed air hose extending to a tool such as a jack hammer, pneumatic drill, etc., will become accidentally detached while the tool is in operation. This is particularly the case when the tool is of a type through which vibration is transmitted continuously to the connecting fitting between the hose and the tool. Under these circumstances, the wing nut or other fastener means incorporated in such a fitting tends to loosen without the knowledge of the worker, and the hose becomes suddenly detached from the tool while the same is in operation.

As a result, compressed air flows freely through the hose, and causes the free end of the hose, that is, that end that became detached accidentally from the tool, to flail about erratically and with great force. Serious injuries to workers standing nearby can, as a result, be caused and such injuries have, in point of actual fact, resulted many times under these circumstances.

The main object of the present invention is to provide a safety valve adapted to be connected between the outlet end of the compressed air hose, and the tool itself, with said valve being so designed as to be connected permanently to the hose, so that should the hose become detached accidentally from the tool, it will carry with it the safety valve. It is proposed, in this connection, to so design the safety valve as to cause the same to be automatically adjusted to a closed position, immediately upon accidental detachment of the hose from the tool. In this way, the flow of compressed air out of the hose will be halted immediately, thus preventing the hose from whipping about and causing injury to nearby workers.

Another object of importance is to so design the safety valve as to cause the same to be normally maintained in an open position, with the valve being shiftable to a closed position by a pressure drop across the same caused by the accidental occurrence mentioned. Such pressure drop always occurs when the hose becomes detached completely from the tool, and thus it is seen that the valve will act automatically to close off the flow of air under the dangerous circumstances described.

Another object of importance is to so design the safety valve as to permit the adjustable setting of the valve in its open position. It is proposed, in this regard, to associate with the stem of the valve a brake means which is of simple design, but which is nevertheless readily shiftable into any of various selected relationships to the valve stem, to controllably impede the free rotational movement of the valve stem within the body of the device. Valve settings, that will result in closing the valve only when the pressure drop exceeds a predetermined value, are thus possible.

Still another object is to provide a generally improved valve of the type stated in which the valve, when in open position, will be supported upon an inclined baffle means, with said baffle means and an associated valve plate being so arranged in the open valve position as to define a pocket which will trap part of the flow of compressed air below the valve plate when said pressure drop across the plate exceeds a predetermined value, thereby to lift the plate and shift the same to its closed position.

Other objects and advantages of the present invention will become apparent when considered in conjunction with the attached drawings, in which.

Figure 1:
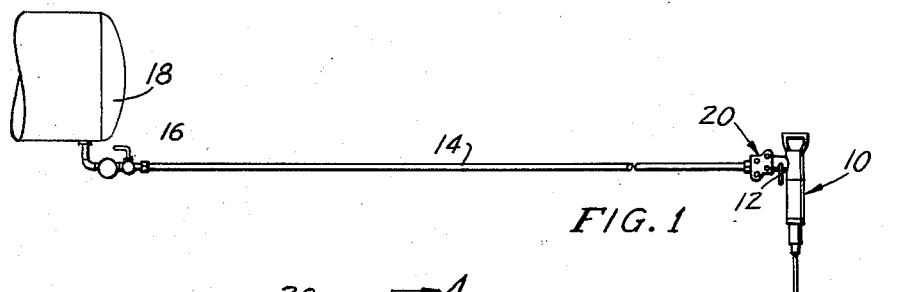
Figure 1 is a somewhat diagrammatic view showing the valve in operative relationship to a jack hammer and associated compressed air supply apparatus.

In Figure 1 there is shown a conventional jack hammer generally designated 10, having an operator-controlled valve mechanism 12. Connected to the jack hammer is the outlet end of a compressed air supply hose 14, said hose being provided adjacent its inlet with a main valve 16, the inlet end of the compressed air hose being attached to a tank 18 in which the air is maintained under pressure by suitable apparatus, not shown. Ordinarily, when the hose 14 becomes detached from the tool 10, the free end thereof will flail wildly about, until a worker can reach the main valve 16. Valuable time is lost before the flow of air is cut off, during which time serious injury may be caused to a worker.

The safety valve constituting the present invention has been generally designated at 20. It is composed of a pair of substantially semi-cylindrical sections 22, 24 connected in side-by-side relation to provide a cylindrical valve body. Section 22 is formed with a plurality of apertured ears 26, said ears being disposed at the top and bottom of the section, at its opposite ends. Section 24 has ears 28 engageable against the ears 26 to receive connecting bolts 30. On the ends of the section 22, semi-cylindrical, externally threaded portions 32 are formed, and corresponding portions 34 are formed upon the opposite ends of the section 24. Said portions, when the sections are connected, cooperate to define externally threaded cylindrical end portions on the valve body, adapted for connection to the tool and hose respectively. The connection of the valve to the hose would be a permanent one, so that should the conventional wing nut provided upon the tool loosen, the safety valve will become detached from the tool along with the hose. The other end of the valve body, of course, is attached to the tool itself.

Formed upon the section 22, intermediate its opposite ends, it is a laterally projecting boss 36 having a bearing recess 38 extending normally to the axis of the valve body. A shaft 40 has one end journalled in the recess 38, the shaft extending transversely across the bore of the valve body. The other end portion of the shaft or valve stem extends through a tapered bore 42 formed in the section 24 and coaxially aligned with the bearing recess 38. At its larger end, bore 42 merges into a counter bore, formed in a laterally extending projection or housing 44 integrally formed upon the wall of and extending outwardly from the section 24.

At its outer end, the projection 44 is formed with external threads, engaging complementary threads formed upon the inner surface of a peripheral flange provided upon a cap 48. Cap 48 has a center opening receiving the valve stem, and circumposed about the stem, in contact with the inner surface of the cap, is an annular steel bushing 49. Bushing 49 bears against a series of packing rings 50, preferably of graphite, that are circumposed about the valve stem within the counterbore. A frustroconical bushing 52 is seated in the tapered bore 42, and is adapted to be shifted longitudinally of said tapered bore, responsive to threading of the cap 48 onto the projection 44. In other words, the bushing 52 is shifted toward the inner end of the tapered bore 42 responsive to threading of the cap in said inward direction. When the cap is threaded outwardly, the bushing 52 will automatically loosen within the bore 42, due to the fact that the bushing is split from end to end and is of spring material, normally springing to a position in which it is loosely engaged with the valve stem.

At its larger end, the bushing 52 is formed with a collar 54, of a diameter corresponding to that of the counterbore 46. In this connection, at the inner end of the counterbore there is provided an annular shoulder 56, where said counterbore merges into the larger end of the tapered bore 42. Collar 54 will, ultimately, engage against shoulder 56 when the cap 48 is threaded inwardly of the projection 44.

By reason of the arrangement illustrated, it will be seen that pressure is transmitted to the bushing 52 through the bushing 49 and packing rings 50, to bind the bushing 52 against the stem, thus to impede the free rotatable movement of the stem to an adjustable extent.

The stem projects out of the center opening of the cap, and the projecting portion thereof is formed with a non-circular tool-receiving formation, adapted to receive a wrench or the like, whenever it is necessary to manually rotate the stem. However, said manual rotation is not required for normal operation of the valve. A graduated scale, not shown, on projection 44, traversed by an index marking, also not shown, on cap 48, can be used to facilitate the making of accurate adjustments, if desired.

Figure 3:
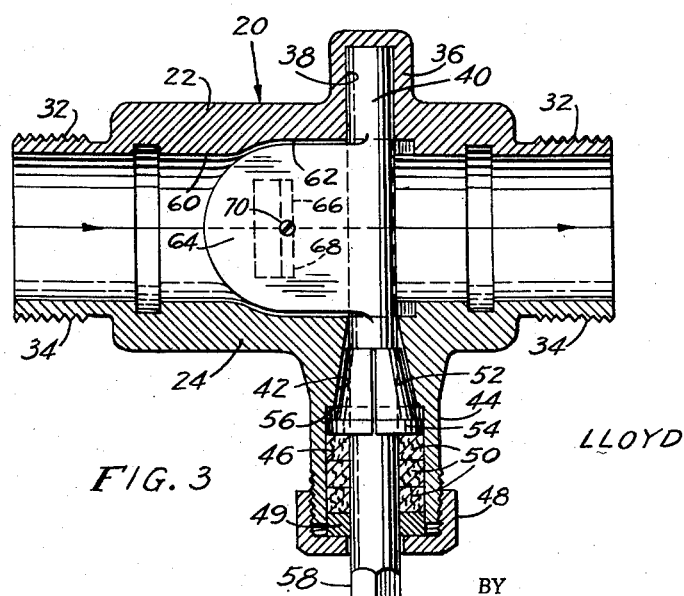
Figure 3 is a sectional view on line 3—3 of Figure 2.

The connected, mating valve body sections 22, 24 cooperate to define an end to end bore 60 within the valve body, through which the compressed air flows. Normally, the compressed air will flow in the direction of the arrows shown in Figure 3. Under these circumstances, the tool 10 can be operated in a conventional manner, by selective opening or closing of its operating valve 12.

Figure 4:
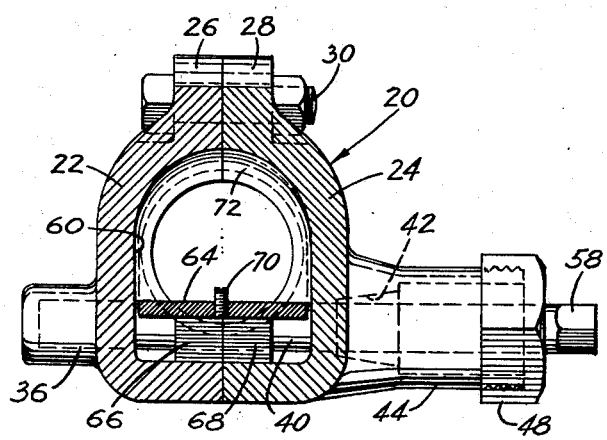
Figure 4 is a transverse sectional view on line 4—4 of Figure 2.
Figure 5:
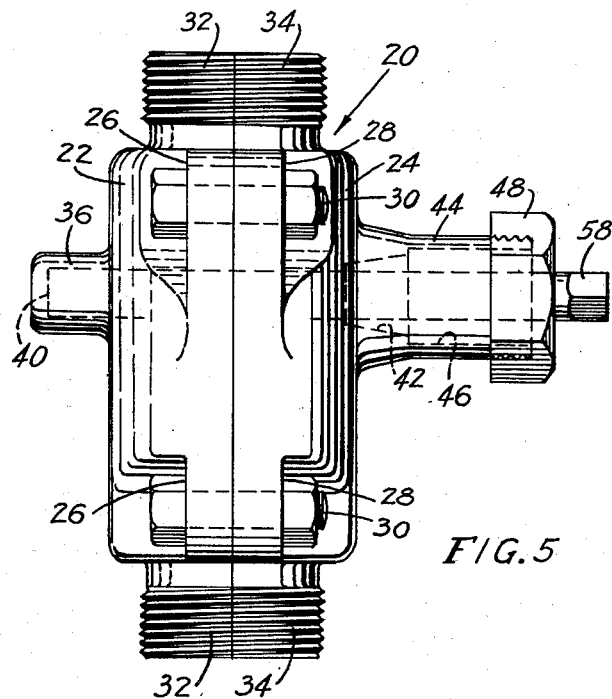
Figure 5 is a top plan view of the valve.
Figure 6:
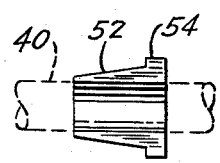
Figure 6 is a side elevational view of a conical bushing incorporated in the valve, the valve stem being shown fragmentarily and in dotted outline.

In these circumstances, there is disposed, in an enlarged portion 62 of the bore 60, a flat valve plate 64 fixedly secured to and extending approximately radially of the valve stem 40. Said valve plate, under the normal operating conditions referred to, will be seated in the position thereof shown in Figures 3 and 4, in an open position in which the flow of compressed air through the passage 60 is unimpeded. The valve plate, in this position, is supported upon an inclined baffle consisting of aligned baffle sections 66, 68 integrally formed upon the floor portions of the valve body sections 22, 24. The baffle sections together constitute a baffle extending transversely of the floor of the valve body, and inclined to lie in a plane oblique to the longitudinal center line of the valve body, that is, oblique to the path of flow of compressed air through said body.

Figure 2:
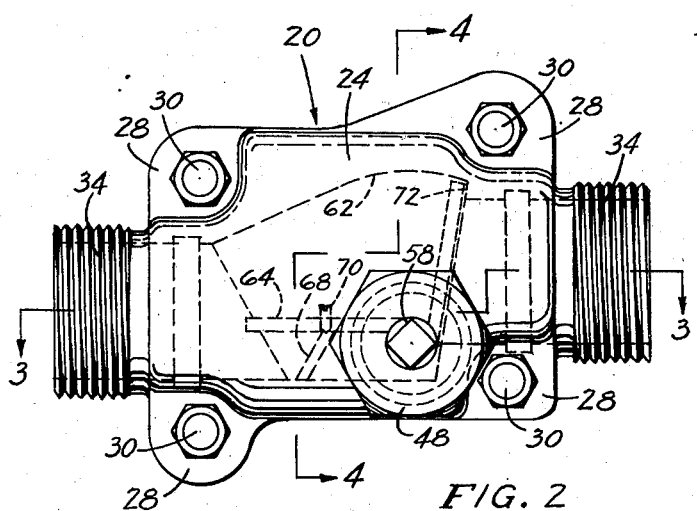
Figure 2 is a side elevational view of the valve per se.

A threaded opening is formed in the plate 64, and engaged therein is a screw 70, which is threadable against the top edge of the baffle, so as to adjust the open position of the plate 64. In other words, although the plate 64 is shown seated directly upon the upper edge of the baffle in the drawing, the screw 70 can be threaded downwardly in Figure 2 or in Figure 4 so as to engage against the baffle, thereby elevating the valve plate in its open position to a certain extent.

The valve plate will, of course, be normally held in open position due to the fact that the free rotation of the valve stem is adjustably impeded in the manner previously described. The pressure above and below the valve plate will accordingly be the same, and under these circumstances the valve plate will not be subjected to any force tending to close the same.

Should the valve and the hose become accidentally detached from the jack hammer, there will be a pressure drop across, that is, above the valve plate. Under these circumstances, that portion of the compressed air trapped between the inclined baffle 68 and the free edge portion of the valve plate will elevate the valve plate, thus swinging the same about the axis of the stem 40, the stem 40 rotating to an extent sufficient to cause the valve plate to ultimately come to rest against an abutment 72 formed in the valve bore 60. The valve plate will now extend directly across the passages to block the flow of air therethrough, thus shutting off the supply of compressed air and preventing the hose from whipping wildly about in an uncontrolled manner.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claim.

What is claimed is:

A safety valve connectable in a line through which a fluid under pressure flows, comprising: a valve body having a fluid flow bore and including hollow projections at its opposite sides communicating with said bore, one of said projections having a tapered bore and a counterbore communicating with the larger end of the tapered bore; a valve stem journalled at its ends in the projections and extending transversely of the first named bore; a cap on said one projection, said cap being threadable upon its associated projection toward and away from the valve body; a valve plate rigid with and swingable about the axis of the stem between a first, flow-permitting and a second, flow-preventing position; a conical bushing circumposed about the stem in the tapered bore of said one projection, said bushing being longitudinally split and being of springable material, so as to be adjustably frictionally engaged with the valve stem responsive to movement of the bushing longitudinally of the tapered bore in the direction of the smaller end of the tapered bore, thus to adjustably impede the free swinging motion of the valve plate; packing rings circumposed about the stem and engaged between the cap and conical bushing, thus to transmit motion to the conical bushing responsive to threading of the cap in the direction of the valve body; abutment means formed on the wall of said fluid flow bore in the path of swinging movement of the valve plate to its second position, to limit movement of the valve plate beyond said second position thereof; and a baffle underlying the plate in the first position thereof, said baffle supporting the plate in said first position and projecting outwardly from the wall of the bore into engagement with the valve plate at a location approximately medially between the ends of the valve plate, thus to define a trap for fluid under pressure between the baffle, the wall of the fluid flow bore, and the portion of the valve plate between the baffle and the free end of the plate, said plate in its first position extending within the path of said pressure fluid so as to be swingable by the pressure of the trapped fluid against its underside created by a pressure drop across the valve plate exceeding a predetermined value, whereby to cause swinging movement of the valve plate to the second position of the plate, to an extent sufficient to overcome the restraint placed upon the free rotation of the stem by said conical bushing.

(References on following page)

References Cited in the file of this patent

UNITED STATES PATENTS

| | | |
|---|---|---|
| 31,799 | Graham | Mar. 6, 1861 |
| 116,326 | Knoche | June 27, 1871 |
| 141,986 | Bird | Aug. 19, 1873 |
| 752,061 | Gander | Feb. 16, 1904 |
| 810,746 | Hadley et al. | Jan. 23, 1906 |
| 813,487 | Dixon | Feb. 27, 1906 |
| 1,050,646 | Grove | Jan. 14, 1913 |
| 1,219,978 | Masters | Mar. 20, 1917 |
| 2,491,104 | Garrison | Dec. 13, 1949 |

FOREIGN PATENTS

| | | |
|---|---|---|
| 9,056 | Great Britain | Apr. 19, 1898 |